United States Patent [19]

Fukushima et al.

[11] Patent Number: 4,537,268
[45] Date of Patent: Aug. 27, 1985

[54] HYDRAULIC CONNECTION MEANS BETWEEN A VEHICLE BODY AND A TRACK-MOUNTED HYDRAULIC MOTOR

[75] Inventors: Akira Fukushima; Yutaka Sugimoto, both of Komatsu, Japan

[73] Assignee: Kabushiki Kaisha Komatsu Seisakusho, Tokyo, Japan

[21] Appl. No.: 544,895

[22] Filed: Oct. 24, 1983

[30] Foreign Application Priority Data

Oct. 25, 1982 [JP] Japan ............................ 57-160216[U]

[51] Int. Cl.³ .............................................. B62D 65/00
[52] U.S. Cl. .................................... 180/9.1; 180/6.48; 137/351; 172/292; 305/10
[58] Field of Search ........................ 180/9.1, 6.48, 184, 180/185, 186, 190, 192, 194, 195; 280/5.22, 28.5; 172/292; 137/351, 354, 899; 305/10, 31, 32

[56] References Cited

U.S. PATENT DOCUMENTS

| | | | |
|---|---|---|---|
| 2,818,126 | 12/1957 | Vogelaar | 180/6.48 |
| 3,872,939 | 3/1975 | Eckert | 180/6.48 |
| 3,907,053 | 9/1975 | Savage | 180/6.48 |
| 4,431,043 | 2/1984 | Goodell et al. | 137/351 X |

Primary Examiner—Joseph F. Peters, Jr.
Assistant Examiner—Mitchell J. Hill
Attorney, Agent, or Firm—Armstrong, Nikaido, Marmelstein & Kubovcik

[57] ABSTRACT

A hydraulically driven track-type vehicle having conduit assemblies for hydraulic fluid connected between hydraulic motors respectively mounted on track frames for driving the vehicle and hydraulic fluid pipes mounted on the vehicle body. Each of the conduit assemblies comprises flexible pipes connected between the hydraulic fluid pipes and respective one ends of passages formed in a member for pivotally mounting thereon each of the track frames, and conduits of steel pipes connected between respective other ends of the passages and each of the motors. The mounting member pivotally mounted on each of pivot shaft casings projecting outwardly on both sides of the vehicle body.

3 Claims, 3 Drawing Figures

HYDRAULIC CONNECTION MEANS BETWEEN A VEHICLE BODY AND A TRACK-MOUNTED HYDRAULIC MOTOR

BACKGROUND OF THE INVENTION

1. Field of the Invention

This invention relates to a hydraulically driven track-type vehicle, and more particularly to a hydraulically driven-type vehicle wherein hydraulic motors for driving the vehicle are arranged in the respective widths of tracks mounted on both sides of the vehicle.

2. Description of the Prior Art

In the previously provided hydraulically driven track-type vehicles such as power shovels etc., hydraulic motors for driving the vehicle are located in the respective widths of tracks mounted on both sides of the vehicle and supplied with hydraulic fluid through high pressure conduits extending from the vicinity of pivot shafts projecting outwardly on both sides of the vehicle body and supporting track frames. In this hydraulically driven track-type vehicle, track frames on which hydraulic motors are mounted are arranged to be pivotable about the above-mentioned pivot shaft. Therefore, flexible pipes such as high pressure hoses, etc., each being made of rubber or synthetic rubber as a main part thereof are connected between hydraulic fluid pipes arranged in the vicinity of the pivot shafts and the hydraulic motors so that the displacement of the hydraulic motors due to movement of the track frames can be absorbed sufficiently. However, the previously provided hydraulically driven track-type vehicle wherein the flexible pipes are exposed in the lower portion of the vehicle body, and particularly in the peripheries of the track frames are disadvantageous in that the flexible tubes are liable to be damaged by external obstacles such as rock or the like thus making running of the vehicle impossible.

SUMMARY OF THE INVENTION

The present invention has been contemplated to eliminate the above-mentioned disadvantage of the previously provided hydraulically driven track-type vehicles and has for its aspect to provide a hydraulically driven track-type vehicle wherein high pressure pipes connected to hydraulic motors arranged in the respective widths of tracks mounted on both sides of the vehicle are protected from being damaged by external obstacles such as stones and rocks and the above-mentioned high pressure pipes are arranged to absorb the displacement of the hydraulic motors due to movement of the track frames.

To achieve the above-mentioned aspect, according to the present invention, there is provided a hydraulically driven track-type vehicle including pivot shafts which respectively extend inside pivot shaft casings projecting outwardly on both sides of the vehicle body in a cantilevered manner, one end of each of said pivot shafts being fixedly secured to the vehicle body and the other end thereof being supported by the leading end of each of the pivot shaft casings, and track frames mounted on both sides of the vehicle and pivotably supported through track frame mounting members by the respective leading ends of said pivot shafts, characterized in that said vehicle comprises flexible pipes connected between respective one ends of hydraulic fluid passages formed in said track frame mounting members and hydraulic fluid pipes mounted on the vehicle body, and conduits connected between hydraulic motors respectively mounted on the rear portions of said track frames in such a manner as being arranged in the respective widths of tracks and respective other ends of said hydraulic fluid passages.

Further, according to the present invention, there is provided a hydraulically driven track-type vehicle wherein the above-mentioned flexible pipes are accommodated in the pivot shaft casings.

Still further, according to the present invention, there is provided a hydraulically driven track-type vehicle wherein the conduits connected between said hydraulic motors and said hydraulic fluid passages are rigid steel pipes.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE INVENTION

Figure 1:
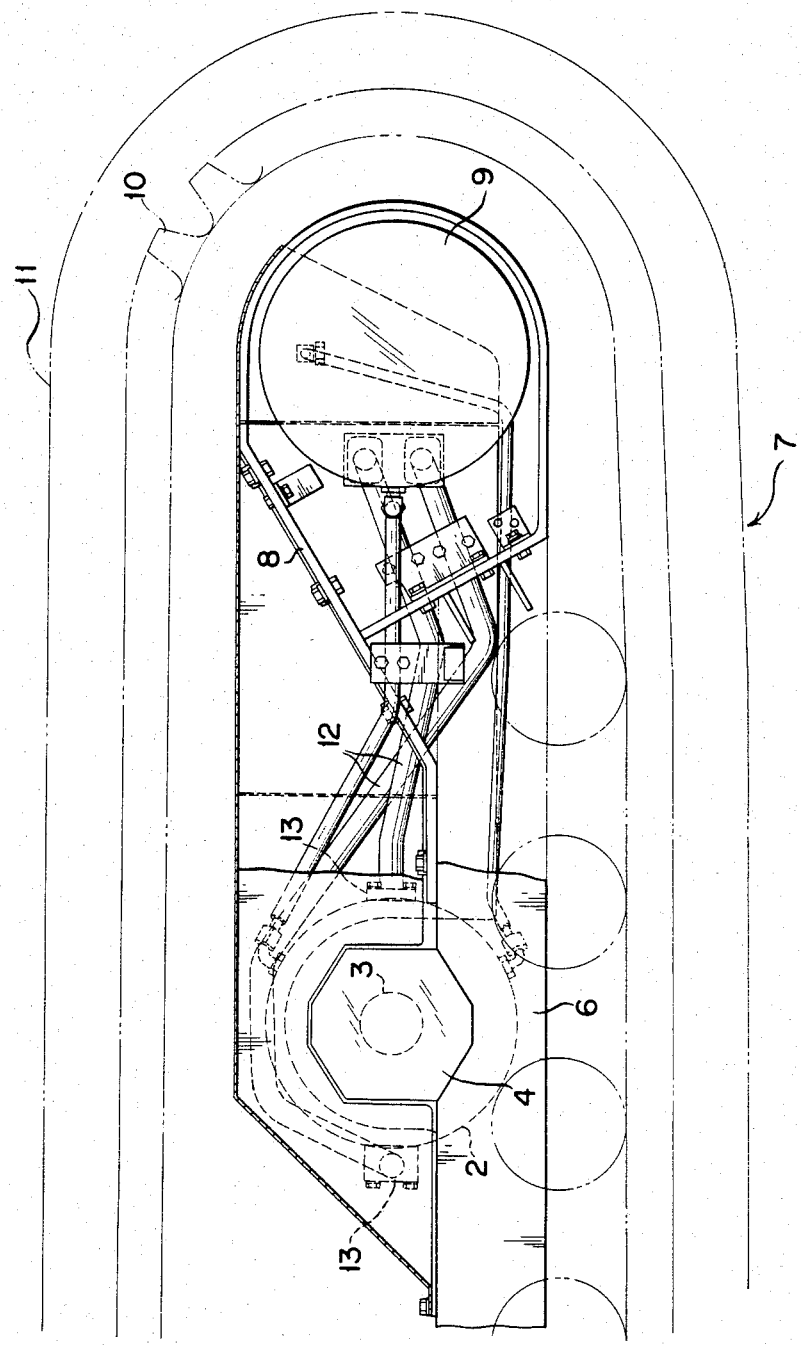
FIG. 1 is a schematic fragmentary side elevational view of a hydraulically driven track-type vehicle.
Figure 2:
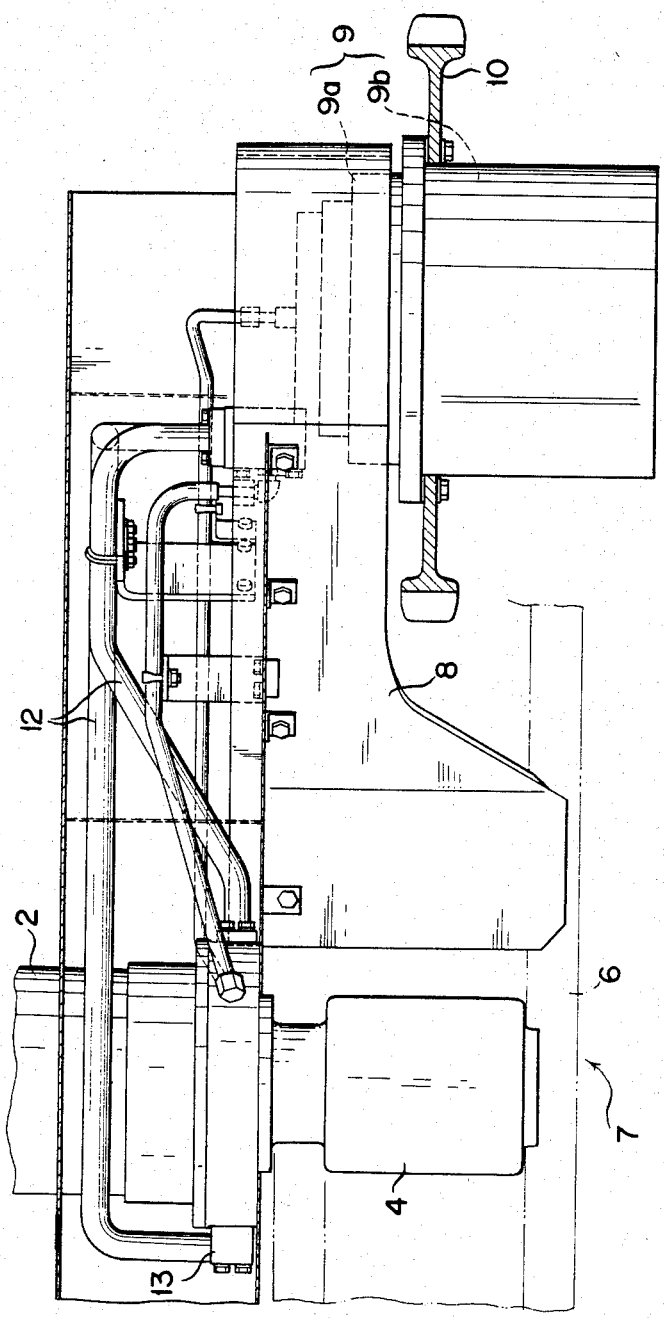
FIG. 2 is a schematic fragmentary plan view of the hydraulically driven track-type vehicle.
Figure 3:
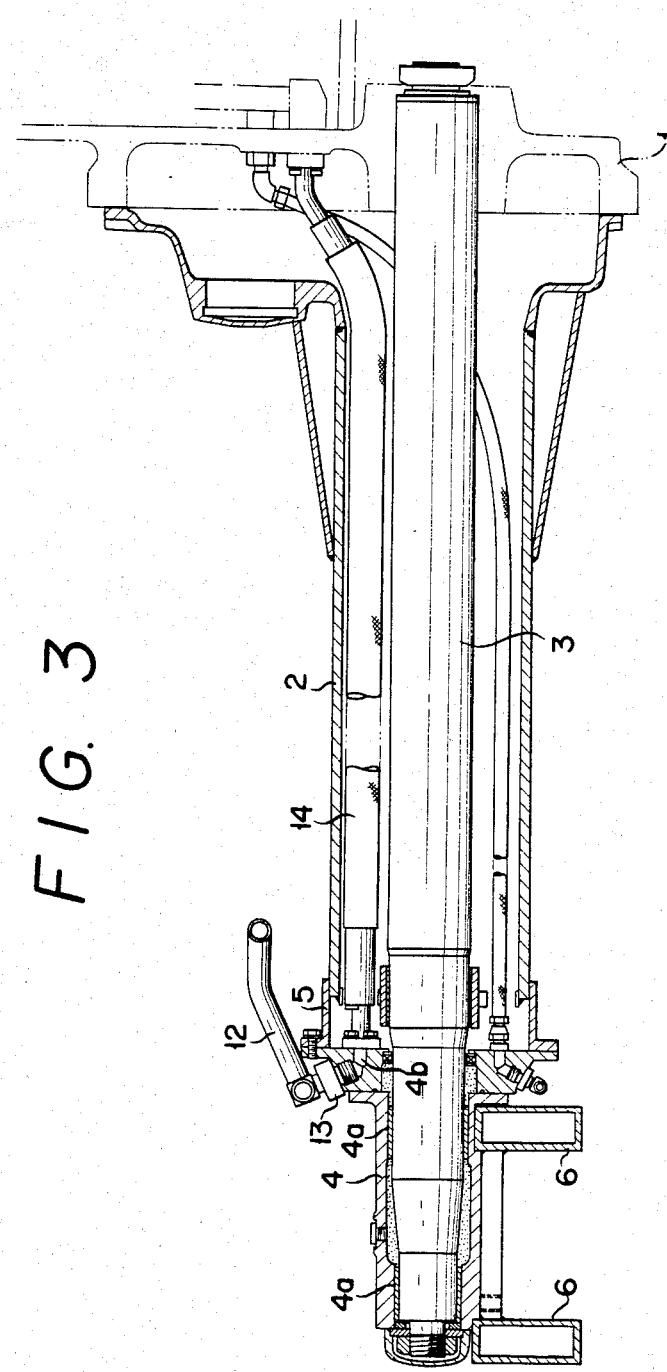
FIG. 3 is a schematic cross-sectional veiw of a pivot shaft mounted on the hydraulically driven track-type vehicle and its casing.

The present invention will now be described below by way of example with reference to the accompanying drawings. The following description and the illustration of the drawings refer to only one side of a hydraulic driven track-type vehicle in order to avoid duplication. In the drawings, reference numeral 1 denotes a hydraulically driven track-type vehicle body, and 2 a cylindrical pivot shaft casing projecting outwardly on each side of the vehicle body 1. A pivot shaft 3 is accommodated in the casing 2. One end of the pivot shaft 3 is fixedly secured to the vehicle body 1, and the other end thereof is supported by the leading end of the above-mentioned pivot shaft casing 2. A track frame mounting member 4 is rotatably mounted on the leading end of the pivot shaft 3 through a bearing 4a. Detachably mounted at one end of the above-mentioned track frame mounting member 4 is a cylindrical cover 5 which is pivotally mounted on the outer periphery of the leading end of the pivot shaft casing 2. This cover 5 serves to prevent earth and sand etc. from making entry into the pivot shaft casing 2, and a track frame 6 is fixedly secured to the lower portion of the track frame mounting member 4. The above-mentioned track frame 6 constitutes a track assembly 7 on each side of the vehicle body 1. Fixedly secured to the rear end of the track frame 6 is a frame 8 on which a hydraulic motor 9 is mounted. Therefore, the hydraulic motor 9 is arranged to be movable together with the track frame 6. The above-mentioned hydraulic motor 9 comprises a body 9a fixedly secured to the frame 8 and a rotatable part 9b adapted to be rotated relative to the boby 9a. Fitted to the rotatable part 9b is a sprocket 10. An endless track 11 is wound around the sprocket 10 and is arranged to be driven by the hydraulic motor 9.

Each one end of conduit 12 made of steel pipe is connected to the hydraulic motor 9. Each other end of the conduits 12 extends towards the pivot shaft 3 in approximately V-shape between the vehicle body 1 and the track frame 6 and is connected through a joint 13 fixedly secured to the track frame mounting member 4 to one end of a hydraulic fluid passage 4b. The other end of the hydraulic fluid passage 4b opens in the pivot shaft casing 2. And, one end of a flexible pipe 14 is connected to the opening. The flexible pipe 14 extends in the pivot shaft casing 2 along the pivot shaft 3, and the other end thereof extends toward the side of the vehicle body 1 and is connected through a hydraulic fluid pipe located on the side of the vehicle body 1 to a hydraulic pump (not shown).

As described in detail hereinabove, according to the present invention, hydraulic fluid under pressure discharged by a hydraulic pump (not shown) mounted on the vehicle body 1 is supplied through a flexible pipe 14 installed in the pivot shaft casing 2 and then through the conduit 12 made of steel pipe, one end of which is connected to the track frame mounting member 4, into the hydraulic motor 9. Because the conduit 12 exposed externally in the periphery of the track is made of a steel pipe, such disadvantages as the conduit 12 is damaged by the contact with stones and rocks in operation thus making running of the vehicle impossible and causing spouting of high pressure fluid from damaged conduit can be eliminated. Further, the displacement of the track frame 6 and the hydraulic motor 9 mounted thereon about the pivot shaft 3 can be absorbed by a distortion of the flexible pipe 12 located in the pivot shaft casing 2. In addition, as the flexible pipe 12 is covered by the pivot shaft casing 2, there is no fear of the flexible pipe being damaged by stones and rocks, etc..

It is to be understood that the foregoing description is merely illustrative of a preferred embodiment of the present invention and that the present invention is not to be limited thereto, but is determined by the scope of the appended claims.

What we claim is:

1. A hydraulically driven track-type vehicle including pivot shafts which respectively extend inside pivot shaft casings projecting outwardly on both sides of the vehicle body in a cantilevered manner, one end of each of said pivot shafts being fixedly secured to the vehicle body and the other end thereof being supported by the leading end of each of the pivot shaft casings, and track frames mounted on both sides of the vehicle and pivotally supported through track frame mounting members by the respective leading ends of said pivot shafts, characterized in that said vehicle comprises flexible pipes connected between respective one ends of hydraulic fluid passages formed in said track frame mounting members and hydraulic fluid pipes mounted on the vehicle body, and conduits connected between hydraulic motors respectively mounted on the rear portions of said track frames and respective other ends of said hydraulic fluid passages.

2. A hydraulically driven track-type vehicle as claimed in claim 1, characterized in that said flexible pipes are accommodated in said pivot shaft casings.

3. A hydraulically driven track-type vehicle as claimed in claim 1, characterized in that said conduits connected between said hydraulic motors and said hydraulic passages are rigid steel pipe.

* * * * *